(12) United States Patent
Azegami et al.

(10) Patent No.: US 10,449,611 B2
(45) Date of Patent: Oct. 22, 2019

(54) BALL END MILL

(71) Applicant: MITSUBISHI MATERIALS CORPORATION, Tokyo (JP)

(72) Inventors: Takayuki Azegami, Akashi (JP); Taro Abe, Akashi (JP); Masanori Kawasaki, Kariya (JP)

(73) Assignee: Mitsubishi Materials Corporation, Tokyo (JP)

( * ) Notice: Subject to any disclaimer, the term of this patent is extended or adjusted under 35 U.S.C. 154(b) by 210 days.

(21) Appl. No.: 15/030,424

(22) PCT Filed: Oct. 23, 2014

(86) PCT No.: PCT/JP2014/078235
§ 371 (c)(1),
(2) Date: May 20, 2016

(87) PCT Pub. No.: WO2015/060392
PCT Pub. Date: Apr. 30, 2015

(65) Prior Publication Data
US 2016/0303664 A1 Oct. 20, 2016

(30) Foreign Application Priority Data
Oct. 23, 2013 (JP) .................................. 2013-220639

(51) Int. Cl.
*B23C 5/10* (2006.01)
(52) U.S. Cl.
CPC .............. *B23C 5/1009* (2013.01); *B23C 5/10* (2013.01); *B23C 2210/203* (2013.01); *B23C 2210/285* (2013.01); *B23C 2210/54* (2013.01)

(58) Field of Classification Search
CPC ...... B23C 5/10; B23C 5/1009; B23C 2210/54
See application file for complete search history.

(56) References Cited

U.S. PATENT DOCUMENTS

| 2004/0170480 A1* | 9/2004 | Kawai | ...................... B23C 5/10 407/53 |
| 2007/0286691 A1* | 12/2007 | Glimpel | ................... B23C 5/10 407/54 |

(Continued)

FOREIGN PATENT DOCUMENTS

| CN | 101790432 A | 7/2010 |
| CN | 102497950 A | 6/2012 |

(Continued)

OTHER PUBLICATIONS

Description DE102005043841 obtained at https://worldwide.espacenet.com/ (last visited Nov. 7, 2018).*

(Continued)

*Primary Examiner* — Ryan C Rufo
(74) *Attorney, Agent, or Firm* — Locke Lord LLP

(57) ABSTRACT

In the ball end mill, at least two end cutting edges are extended to the vicinity of an axis at a tip portion of an end mill main body which rotates around the axis. In two gashes in which two end cutting edges adjacent to each other in a circumferential direction are formed, a first gash on the end mill rotation direction side extends beyond the axis on the tip of the end mill main body and a second gash on the rear side in the end mill rotation direction does not exceed the axis. A first tip flank face which intersects with the first gash through a first end cutting edge is extended toward a second tip flank face which intersects with the second gash through a second end cutting edge.

4 Claims, 5 Drawing Sheets

(56) References Cited

U.S. PATENT DOCUMENTS

| | | | | |
|---|---|---|---|---|
| 2011/0085862 A1* | 4/2011 | Shaffer | ................... | B23C 5/10 |
| | | | | 407/54 |
| 2012/0170984 A1* | 7/2012 | Azegami | ............... | B23C 5/1009 |
| | | | | 407/54 |
| 2013/0078044 A1 | 3/2013 | Sharivker et al. | | |

FOREIGN PATENT DOCUMENTS

| | | | | | |
|---|---|---|---|---|---|
| DE | 102005043841 A1 | | 3/2007 | | |
| EP | 2422907 A1 | | 2/2012 | | |
| JP | 10-128611 A | | 5/1998 | | |
| JP | 11-165212 A | * | 6/1999 | ................ | B23C 5/10 |
| JP | 2001-025915 A | * | 1/2001 | ................ | B23C 5/28 |
| JP | 2003-039223 A | | 2/2003 | | |
| JP | 2005-066701 A | * | 3/2005 | ................ | B23C 5/10 |
| JP | 3840661 B2 | | 11/2006 | | |
| JP | 2009-056559 A | | 3/2009 | | |
| JP | 2010-214500 A | | 9/2010 | | |
| JP | 5239963 B2 | | 7/2013 | | |
| WO | 2013/118829 A1 | | 8/2013 | | |
| WO | 2013/146237 A1 | | 10/2013 | | |
| WO | 2013/146238 A1 | | 10/2013 | | |
| WO | 2015/020118 A1 | | 2/2015 | | |

OTHER PUBLICATIONS

Supplementary European Search Report dated May 10, 2017, issued for the European patent application No. 14855943.8.

Daoquan Wu et al., "A Research on the Structure of the Cylindrical End Mill With Ball-Nose," Journal of Guizhou Institute of Technology, vol. 25, No. 1, Feb. 29, 1996, pp. 1-11 and English abstract thereof.

Office Action dated Sep. 26, 2016, issued for the Chinese patent application No. 201480046031.9 and English translation thereof.

Notice of Allowance dated Jul. 5, 2016, issued for Japanese Patent Application No. 2013-220639 and English translation thereof.

International Search Report dated Jan. 27, 2015, issued for PCT/JP2014/078235 and English translation thereof.

* cited by examiner

BALL END MILL

TECHNICAL FIELD

The present invention relates to a ball end mill in which an end cutting edge of which a rotational locus around an axis having a convex hemispherical shape and has a center on the axis is formed at a tip portion of an end mill main body which rotates around the axis.

Priority is claimed on Japanese Patent Application No. 2013-220639, filed Oct. 23, 2013, the content of which is incorporated herein by reference.

BACKGROUND ART

As such a ball end mill, in, for example, PTL 1, there is proposed a ball end mill in which each of lands of the respective end cutting edges have a convexly rounded curved surface and all edges of the respective lands come into contact with an apex central portion of the entire end cutting edge.

In PTL 2, there is proposed a ball end mill having three or more end cutting edges. In this ball end mill, a cutting edge which is inflected from an end cutting edge (a ball end cutting edge) and extends to the next cutting edge in an end mill rotation direction is provided in the vicinity of a shaft center portion of the end mill when viewed from the bottom of the end mill. A clearance angle of the cutting edge is smaller than a clearance angle of the end cutting edge. An inflection point of the cutting edge is located on the end cutting edge and is distanced from the shaft center by 0.015 mm or more.

CITATION LIST

Patent Literature

[PTL 1] Japanese Unexamined Patent Application, First Publication No. H10-128611
[PTL 2] Japanese Patent No. 3840661

SUMMARY OF INVENTION

Technical Problem

Incidentally, usually, in such a ball end mill, a gash having a concave groove shape having a concave V-shaped cross-section is formed so as to extend toward the inner periphery side at a tip portion of a chip discharge groove formed at the outer periphery of a tip portion of an end mill main body. The gash is formed by a gash grinding wheel having an outer peripheral surface having a convex V-shaped cross-section.

An end cutting edge of which a rotational locus around an axis having a hemispherical shape, the hemispherical rotational locus is convex toward the tip side and has a center on the axis of the end mill main body, is formed at an intersection ridgeline portion between a wall surface facing an end mill rotation direction of the gash and a tip flank face of a tip of the end mill main body.

However, it is difficult to form a protrusion end having a convex V-shaped cross-section, which is formed by the outer peripheral surface of the gash grinding wheel, so as to intersect strictly at an acute angle, and in fact, the protrusion end is rounded.

Further, also during the formation of the gash by the gash grinding wheel, the V-shaped protrusion end is rounded due to so-called shear drop by wear.

Therefore, as in the ball end mill described in PTL 1, if the edges of the lands (that is, all the end cutting edges) are made so as to come into contact with the apex central portion (that is, the axis in the tip of the end mill main body), the gashes overlap each other, whereby the end cutting edges are not formed on the axis. Therefore, the formation of the end cutting edge is difficult in practice.

For this reason, in actuality, it is necessary to form the gash to a position slightly separated from the axis in the tip of the end mill main body and form the end cutting edge at an intersection ridgeline portion between the wall surface facing the end mill rotation direction of the gash and the tip flank face. However, in this case, an intersection ridgeline portion between a rounded portion of an inner peripheral end of the gash and the tip flank face extends slightly further in the end mill rotation direction than an end cutting edge portion in which a rotational locus forms a hemispherical shape.

However, a clearance angle is given to the tip flank face so as to gradually retreat from the hemispherical rotational locus toward the rear side in the end mill rotation direction, and therefore, conversely, the intersection ridgeline portion protrudes from the hemisphere toward the end mill rotation direction.

In this manner, if a portion extending in the end mill rotation direction is formed at the inner peripheral end of the gash, a pointed projection portion is formed on the tip side in the vicinity of the axis in the tip of the end mill main body. Therefore, there is a concern that machining accuracy may deteriorate due to a streak being applied to a machined surface of a workpiece by the projection portion during cutting work, or fracturing of an end cutting edge may be caused due to a pointed projection portion being broken and caught in the end cutting edge. Such a problem is also pointed out in PTL 2.

On the other hand, the ball end mill described in PTL 2 is intended to solve the problem in the ball end mill described in PTL 1. However, although it is small, a clearance angle is given to a flank face of the cutting edge which is inflected from the end cutting edge and extends to the next cutting edge, and such a flank face is formed to the shaft center.

Therefore, in fact, similar to the ball end mill described in PTL 1, a pointed projection portion is formed at the position of the shaft center, and thus, there still is a concern that deterioration of machining accuracy or fracturing of the end cutting edge may be caused. Further, all the flank faces of the cutting edges inflected and extended from three or more end cutting edges are formed to the shaft center, and therefore, there is also a concern that the dischargeability of chips by the cutting edge in the vicinity of the axis of the tip of the end mill main body may be impaired.

The present invention has been made under such a background and has an object to provide a ball end mill in which it is possible to attain improvement in machining accuracy or prevention of fracturing of an end cutting edge by preventing a pointed projection portion from being formed in the vicinity of an axis in a tip of an end mill main body and it is possible to attain improvement in chip dischargeability in the vicinity of the axis of the tip of the end mill main body.

Solution to Problem

In order to achieve such an object by solving the above-described problem, according to an aspect of the present invention, a ball end mill is provided including: an end mill main body which rotates around an axis; a plurality of chip discharge grooves formed at intervals in a circumferential direction at an outer periphery of a tip portion of the end mill main body; and a gash which is formed at a tip portion of each of the chip discharge grooves and extends toward an inner periphery side, wherein each end cutting edge of which a rotational locus around the axis having a hemispherical shape is formed at an intersection ridgeline portion between a wall surface facing an end mill rotation direction of the gash and a tip flank face of the tip portion of the end mill main body, which intersects with the wall surface, the hemispherical rotational locus is convex toward the tip side and has a center on the axis, at least two end cutting edges among the end cutting edges are extended to the vicinity of the axis in a tip of the end mill main body, two of the gashes, in which two end cutting edges adjacent to each other in the circumferential direction among these at least two end cutting edges are formed, are formed such that a first gash which is located on the end mill rotation direction side extends beyond the axis on the tip of the end mill main body, and a second gash which is located on the rear side in the end mill rotation direction does not extend beyond the axis on the tip of the end mill main body, a first tip flank face which intersects with a wall surface facing the end mill rotation direction of the first gash through a first end cutting edge out of the two end cutting edges is extended toward a second tip flank face which intersects with a wall surface facing the end mill rotation direction of the second gash through a second end cutting edge out of the two end cutting edges, a concavely curved surface which is concavely curved and connected to an extended portion of the first tip flank face and extends toward the outer periphery side of the end mill main body is formed between the extended portion of the first tip flank face and the second tip flank face, and the second end cutting edge extends in a direction intersecting with the concavely curved surface at an obtuse angle and is connected to the concavely curved surface.

In the ball end mill having such a configuration, first, in the two first and second gashes in which the two first and second end cutting edges adjacent to each other in the circumferential direction, among at least two end cutting edges extended to the vicinity of the axis in the tip of the end mill main body, are formed, the first gash which is located on the end mill rotation direction side is formed so as to extend beyond the axis on the tip of the end mill main body. Therefore, the capacity of a pocket communicating with the chip discharge groove can be secured to be large in the vicinity of the axis due to the first gash, and thus, it is possible to attain improvement in dischargeability of chips by the first end cutting edge.

Then, the first tip flank face which intersects with the first gash through the first end cutting edge is extended toward the second tip flank face adjacent to the rear side in the end mill rotation direction thereof. The concavely curved surface which is concavely curved and connected to the extended portion of the first tip flank face and extends toward the outer periphery side of the end mill main body is formed between the extended portion and the second tip flank face. The second end cutting edge is connected to the concavely curved surface so as to extend in a direction intersecting with the concavely curved surface at an obtuse angle.

In a ball end mill of the related art, a second end cutting edge and a projection portion are formed at an intersection ridgeline portion between a wall surface facing an end mill rotation direction of a second gash having an inner peripheral end which is spaced apart from an axis, and a second tip flank face. However, in the ball end mill according to the present invention, the first tip flank face which gradually retreats from a hemisphere which the rotational locus of the end cutting edge forms, toward the rear side in the end mill rotation direction, is extended, and the concavely curved surface is formed. In this way, it is possible to prevent a projection portion from being formed at the intersection ridgeline portion between the wall surface facing the end mill rotation direction of the second gash having the inner peripheral end which is spaced apart from the axis, and the second tip flank face.

That is, in the ball end mill having the above-described configuration, a configuration is made in which a portion in which a projection portion as described above is formed is chamfered due to the extended portion of the first tip flank face and the concavely curved surface. For this reason, there is no case where a streak is applied to a machined surface by a projection portion during cutting work or a broken projection portion is caught in the end cutting edge, thereby causing end cutting edge fracturing, and thus, it becomes possible to attain improvement in machining accuracy and the extension of the end mill's service life.

Furthermore, the second end cutting edge is connected to the concavely curved surface which is connected to the extended portion of the first tip flank face and extending toward the outer periphery side of the end mill main body, so as to extend in a direction intersecting with the concavely curved surface at an obtuse angle. For this reason, strength in an inner peripheral end of the second end cutting edge is also secured, and thus, it is possible to prevent fracturing or the like.

Further, the second end cutting edge and the concavely curved surface may be made so as to directly intersect one another at an angle which is an obtuse angle. An extended line of the second end cutting edge and an extension surface of the concavely curved surface may be made so as to intersect one another at an obtuse angle through a chamfered portion, a rounded convexly-curved portion, or the like.

However, in either case, it is desirable that an included angle between a straight line connecting the intersection point between the second end cutting edge or the extended line thereof and the concavely curved surface or the extension surface thereof and the center of the hemisphere which the rotational locus of the end cutting edge forms, and the axis is in a range of 1 to 10°.

If the included angle exceeds the above range, the inner peripheral end of the second end cutting edge becomes too far from the axis, and thus, in the vicinity of the axis of the tip of the end mill main body, cutting is performed by only the first end cutting edge. Therefore, a concern arises that a load on the first end cutting edge may become too large.

Further, if the included angle is falls short of the above range, the extended portion of the first tip flank face and the concavely curved surface become too small, and thus, a concern arises that it may not be possible to reliably prevent a projection portion from being formed.

Furthermore, in order for the second end cutting edge to be connected to the concavely curved surface to extend in an direction intersecting with the concavely curved surface at an obtuse angle, it is favorable if the second end cutting edge or the extended line thereof intersects with an intersection ridgeline portion between the concavely curved surface or the extension surface thereof and a rake face of the second end cutting edge, or an intersection ridgeline portion between the concavely curved surface or the extension surface thereof and the tip flank face of the second end cutting edge, at an obtuse angle.

Further, four end cutting edges may be extended to the vicinity of the axis in the tip of the end mill main body by making the tip portion of the end mill main body has a rotational symmetry shape through 180° around the axis.

In a case where four gashes in which these end cutting edges are formed are set to be the first and second gashes alternately in the circumferential direction, if two first gashes among these four gashes are formed with a distance therebetween without intersecting one another, these two first gashes do not communicate with each other in the vicinity of the axis in the tip of the end mill main body. Therefore, the strength of the tip of the end mill main body can be secured, and thus, it is possible to further reliably attain prevention of fracturing of the end cutting edge.

In particular, in a case where four end cutting edges are extended to the vicinity of the axis in the tip of the end mill main body by making the tip portion of the end mill main body has a rotational symmetry shape through 180° around the axis and four gashes of these four end cutting edges are set to be the first and second gashes alternately in the circumferential direction, both the two first gashes are formed so as to cross each other beyond the axis.

Therefore, a chisel in which the first tip flank faces each intersecting with each of the first gashes through the first end cutting edge intersect one another is formed between these two first gashes. For this reason, even in a case where the vicinity of the axis of the tip of the end mill main body is used for cutting, it is possible to perform machining of scraping off the machined surface of a workpiece by the chisel. Therefore, it is possible to attain improvement in machined surface roughness.

Further, the chisel may intersect with the two first end cutting edges at an obtuse angle when viewed in a front view from an axial direction, and be orthogonal to the axis.

Further, the concavely curved surface can be formed by causing a grinding wheel which forms the first tip flank face by grinding work to interfere with the second tip flank face and scraping off an inner peripheral portion of the second tip flank face, when forming the extended portion by extending the first tip flank face toward the second tip flank face.

Further, at the tip portion of the end mill main body, in addition to an end cutting edge extended to the vicinity of the axis in the tip of the end mill main body, as described above, that is, a so-called long end cutting edge, a so-called short end cutting edge, which has an inner peripheral end at a position separated to exceed, for example, the above range of the included angle from the axis and is made such that a rotational locus forms a convex hemisphere along with the long end cutting edge, may be formed.

Advantageous Effects of Invention

As described above, according to the aspect of the present invention, it is possible to improve chip dischargeability in the vicinity of the axis in the tip of the end mill main body and to prevent a projection portion from being formed in the vicinity of the axis. Therefore, a streak being applied to a machined surface of a workpiece by a projection portion, or fracturing occurring due to a projection portion being broken and caught in the end cutting edge during cutting work can be prevented. For this reason, it becomes possible to provide a ball end mill having a longer service life and high machining accuracy.

DESCRIPTION OF EMBODIMENTS

FIGS. 1 to 4B show an embodiment of the present invention.

In this embodiment, an end mill main body 1 is formed of a hard material such as cemented carbide and has a cylindrical shape centered on an axis O. A rear end portion (an upper right portion in FIG. 1, an upper portion in FIG. 2) of the end mill main body 1 is a shank portion 2 having a cylindrical shape. A tip portion (a lower left portion in FIG. 1, a lower portion in FIG. 2) of the end mill main body 1 is a cutting edge portion 3.

Figure 3:
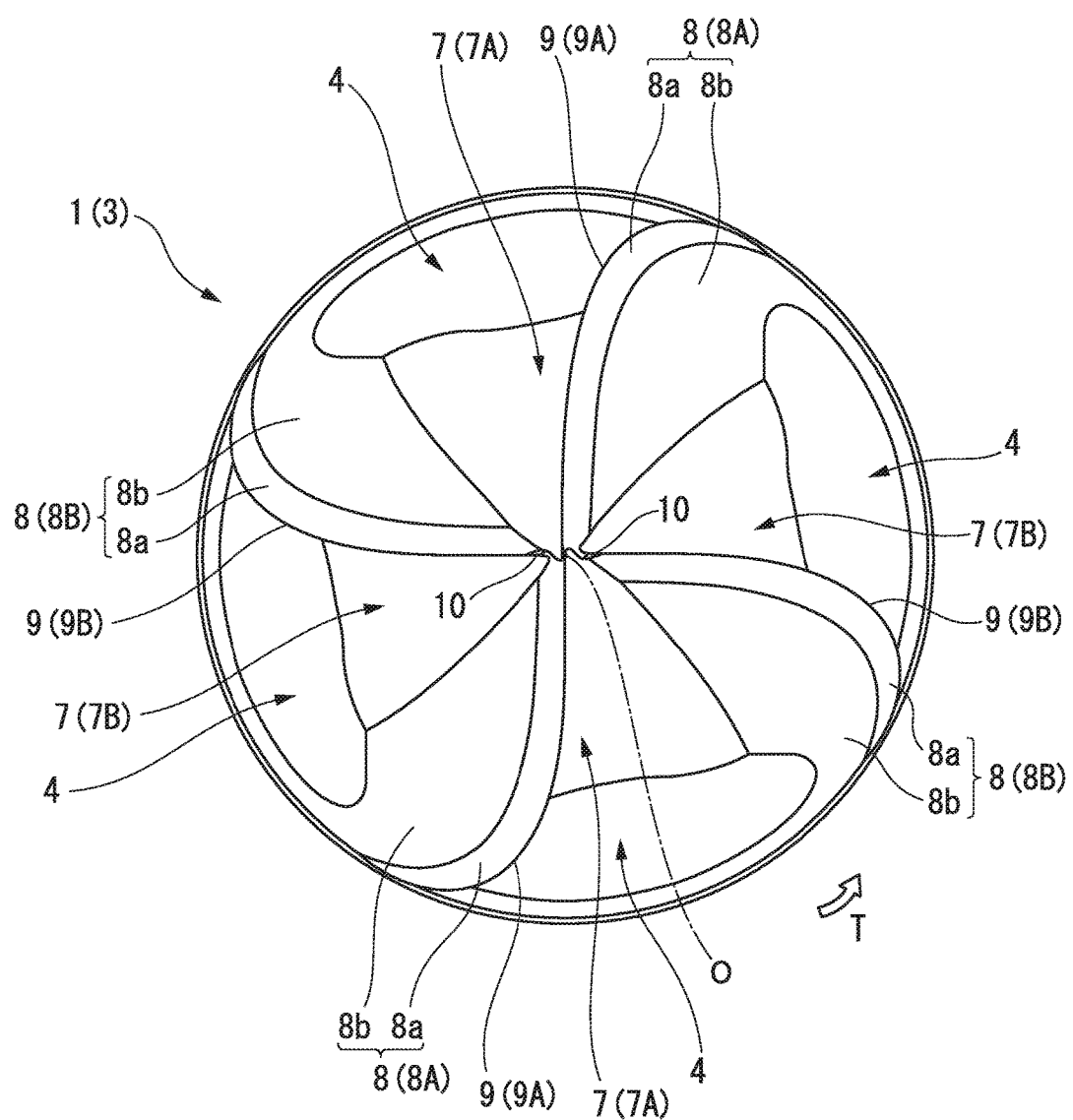
FIG. 3 is an enlarged front view of the embodiment shown in FIG. 1.

Such a ball end mill cuts a workpiece by the cutting edge portion 3 by being fed in a direction intersecting with the axis O while being rotated in an end mill rotation direction T shown in FIG. 3 around the axis O in a state where the shank portion 2 is gripped by a main spindle of a machine tool.

In the cutting edge portion 3 of the tip portion of end mill main body 1, a plurality of chip discharge grooves 4 are formed at intervals in a circumferential direction at an outer periphery thereof. In this embodiment, four chip discharge grooves 4 are formed at regular intervals in the circumferential direction. Each of the chip discharge grooves 4 is formed so as to be spirally twisted to the rear side in the end mill rotation direction T toward the rear end side in a direction of the axis O.

At an intersection ridgeline portion between the wall surface facing the end mill rotation direction T of each of these chip discharge grooves 4 and a peripheral flank face 5 which intersects the wall surface, a peripheral cutting edge 6 which is spirally twisted, similar to the chip discharge groove 4, is formed with the wall surface as a rake face. Four peripheral cutting edges 6 respectively formed in the four chip discharge grooves 4 are located on a single cylindrical surface centered on the axis O.

At a tip portion of each of the chip discharge grooves 4, a gash 7 is formed by cutting out a bottom surface facing the outer periphery side of the end mill main body 1 from the wall surface facing the end mill rotation direction T of the chip discharge groove 4, and a portion further on the rear side in the end mill rotation direction T of a wall surface facing the rear side in the end mill rotation direction T.

The gash 7 is formed in a concave groove shape having, for example, a V-shaped cross-section and provided with a wall surface facing the end mill rotation direction T and a wall surface facing the rear side in the end mill rotation direction T. A valley floor line of the gash 7, in which the wall surfaces intersect one another, gradually extends the inner periphery side of the end mill main body 1 toward the tip side, and reaches the vicinity of the axis O in the tip of the end mill main body 1.

However, a valley floor portion of the gash 7 is practically formed in a cross-sectional concavely-curved line shape such as a concave arc and is connected to both the wall surfaces of the gash 7.

On the other hand, tip flank faces 8 which are respectively connected to the peripheral flank faces 5 of the four peripheral cutting edges 6 and extend toward the inner periphery side of the tip are formed at a tip portion of the cutting edge portion 3.

In this embodiment, as shown in FIG. 3, each of the tip flank faces 8 has a tip-first flank face 8a which has a substantially constant width and is located on the end mill rotation direction T side, and a tip-second flank face 8b which is connected to the rear side in the end mill rotation direction T of the tip-first flank face 8a and is applied with a larger clearance angle than the tip-first flank face 8a.

The wall surface facing the rear side in the end mill rotation direction T of the gash 7 adjacent to the rear side in the end mill rotation direction T of each tip flank face 8 intersects with the rear side in the end mill rotation direction T of the tip-second flank face 8b.

At an intersection ridgeline portion between the wall surface facing the end mill rotation direction T of the gash 7 and the tip-first flank face 8a of the tip flank face 8 which is connected to the rear side in the end mill rotation direction T of each gash 7, an end cutting edge 9 of which a rotational locus around the axis O having a single hemispherical shape, the hemispherical rotational locus is convex toward the tip side of the end mill main body 1 and has a center C on the axis O, is formed so as to be connected to the tip of each of the peripheral cutting edge 6.

Figure 1:
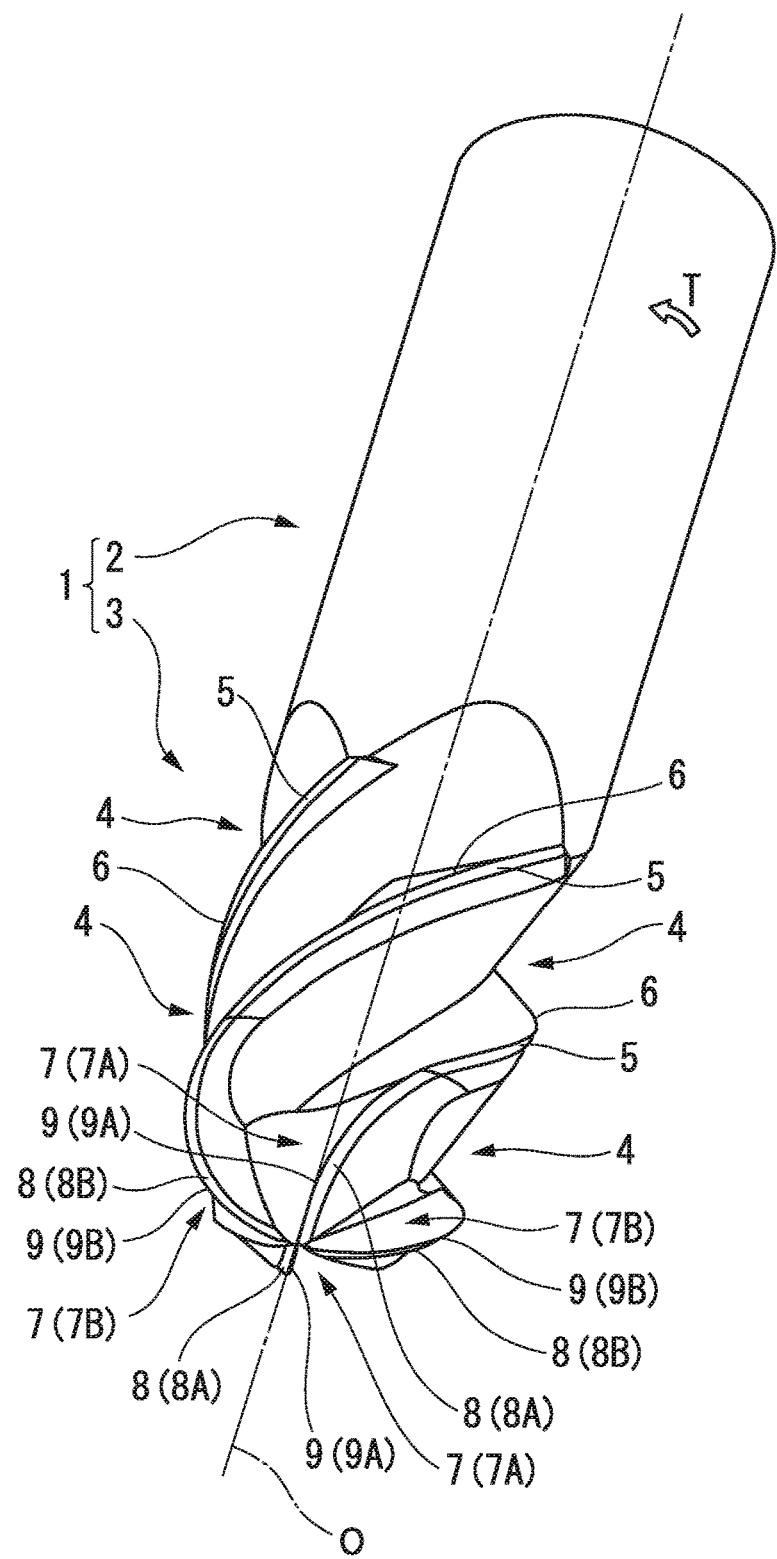
FIG. 1 is a perspective view showing an embodiment of the present invention.
Figure 2:
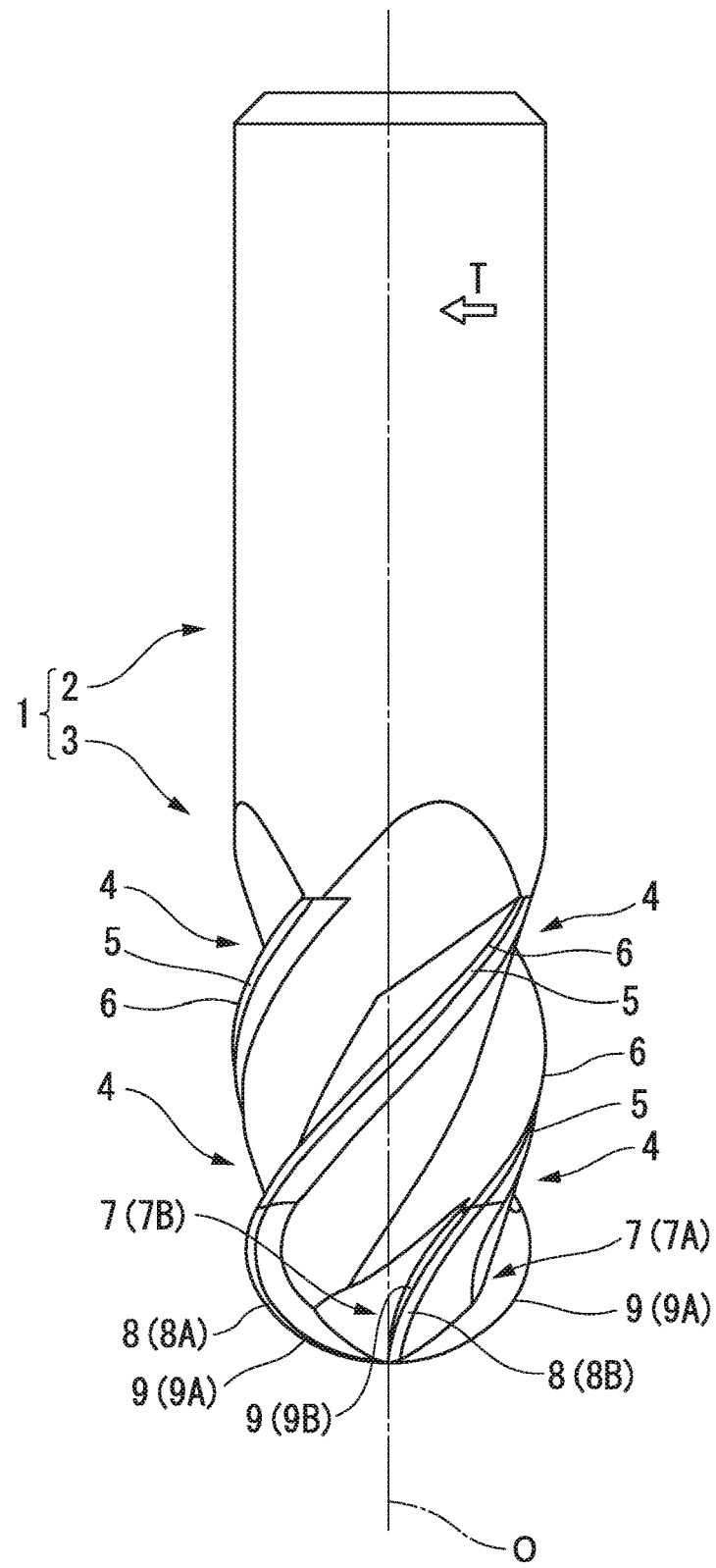
FIG. 2 is a side view of the embodiment shown in FIG. 1.

In this embodiment, these end cutting edges 9 are twisted so as to face the rear side in the end mill rotation direction T toward the rear end side of the end mill main body 1, as shown in FIG. 2.

In this embodiment, all the four end cutting edges 9 which are respectively connected to the four peripheral cutting edges 6 are extended to the vicinity of the axis O in the tip of the end mill main body 1.

Figure 4A:
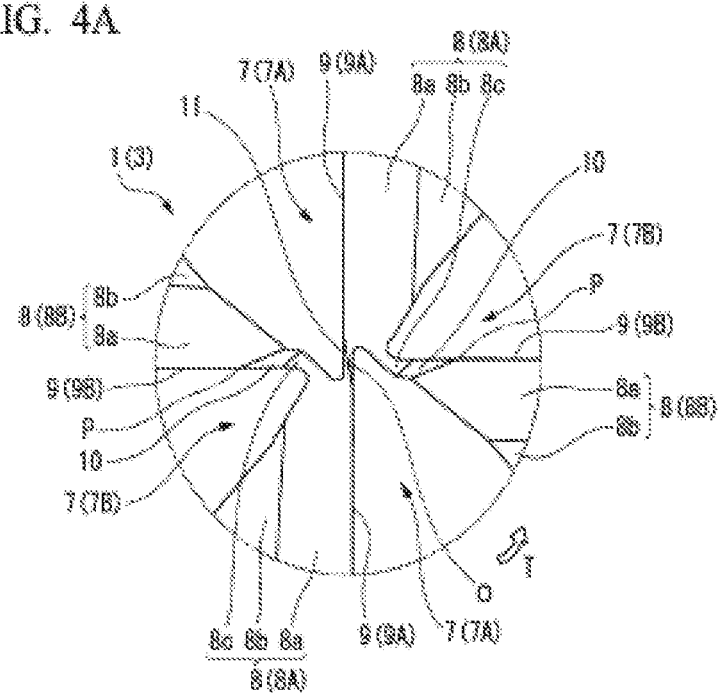
FIG. 4A is a further enlarged front view of the vicinity of an axis in a tip of an end mill main body of the embodiment shown in FIG. 1.
Figure 5A:
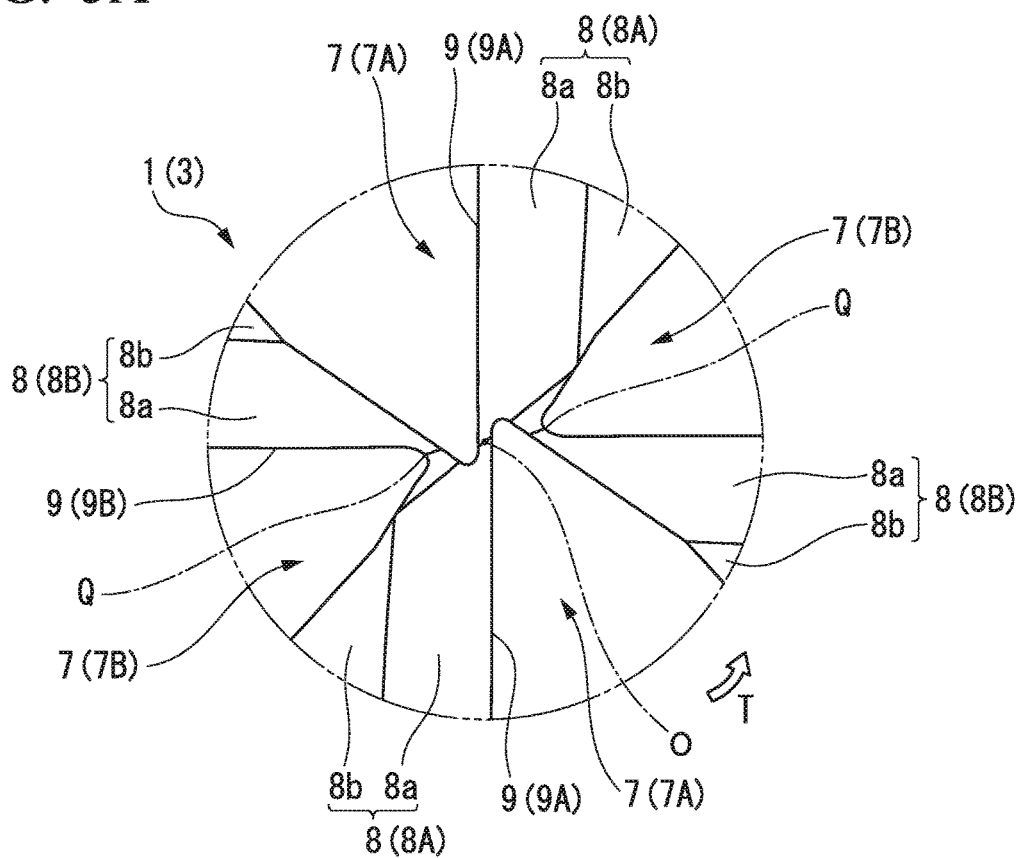
FIG. 5A is a further enlarged front view of the vicinity of the axis in the tip of the end mill main body before an extended portion of a first tip flank face and a concavely curved surface when manufacturing the embodiment shown in FIG. 1 are formed.

In this embodiment, the cutting edge portion 3 is formed in a rotational symmetry shape through 180° around the axis O, the end cutting edge 9 (the end cutting edge extending in an up-and-down direction in FIGS. 3, 4A, and 5A) which is located on the end mill rotation direction T side, out of the two end cutting edges 9 adjacent to each other in the circumferential direction, is regarded as a first end cutting edge 9A, and the end cutting edge 9 (the end cutting edge extending in a rightward-and-leftward direction in FIGS. 3, 4A, and 5A) which is located on the rear side in the end mill rotation direction T of the first end cutting edge 9A is regarded as a second end cutting edge 9B.

Further, the gash 7 in which the first end cutting edge 9A is formed on the wall surface facing the end mill rotation direction T is regarded as a first gash 7A. The gash 7 which is located on the rear side the end mill rotation direction T of the first gash 7A and in which the second end cutting edge 9B is formed on the wall surface facing the end mill rotation direction T is regarded as a second gash 7B.

The tip flank face 8 intersecting with the first gash 7A through the first end cutting edge 9A is regarded as a first tip flank face 8A. The tip flank face 8 intersecting with the second gash 7B through the second end cutting edge 9B is regarded as a second tip flank face 8B.

Here, as shown in FIG. 4A, the first gash 7A extends beyond the axis O on the tip of the end mill main body 1 from the outer periphery side of the cutting edge portion 3. In this way, the two first gashes 7A formed in a rotational symmetry shape through 180° around the axis O at the cutting edge portion 3 are formed with a distance therebetween without intersecting one another.

Further, in this embodiment, the second gashes 7B are also likewise formed with a distance therebetween without intersecting with the first gashes 7A which are located on the end mill rotation direction T side thereof. The second gash 7B is formed apart from the axis O so as not to exceed the axis O and is also formed so as not to intersect with the first gash 7A which is located on the rear side in the end mill rotation direction T.

Further, the second gash 7B intersects with the tip-first flank face 8a of the first tip flank face 8A adjacent to the end mill rotation direction T side thereof.

Further, the first tip flank face 8A is extended to the rear side in the end mill rotation direction T toward the second tip flank face 8B. Between an extended portion 8c in which the first tip flank face 8A is extended and the second tip flank face 8B, a concavely curved surface 10, which is concavely curved and connected to the extended portion 8c and extends toward the outer periphery side, is formed. The second end cutting edge 9B intersects with the concavely curved surface 10 at an obtuse angle at an inner peripheral end P thereof.

In this embodiment, the tip-first flank face 8a of the first tip flank face 8A extends so as to gradually retreat from the rotational locus of the first end cutting edge 9A toward the rear side in the end mill rotation direction T at an unchanged clearance angle, to a position beyond a concavely curved line which is formed by intersection of a valley floor portion of the second gash 7B with the tip-first flank face 8a of the first tip flank face 8A. The extended portion is regarded as the extended portion 8c.

The concavely curved surface 10 is concavely curved at an open angle which is an obtuse angle and connected to the extended portion 8c and gradually rises up toward the outer periphery side along a direction in which the rear side in the end mill rotation direction T and the second end cutting edge 9B extend. In this way, the concavely curved surface 10 is formed so as to intersect with the tip-first flank face 8a of the second tip flank face 8B and the second end cutting edge 9B at an obtuse angle.

Figure 4B:
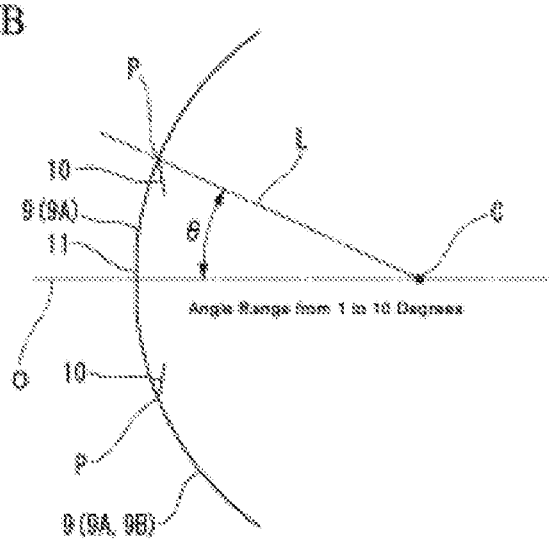
FIG. 4B is a schematic diagram showing a cross section along an axis of a rotational locus in the vicinity of the axis in the tip of the end mill main body of the embodiment shown in FIG. 1 (however, for description, the radius of a hemisphere which the rotational locus forms is made to be smaller than that in FIG. 4A).

Further, as shown in FIG. 4B, an included angle θ between a straight line L which connects the intersection point (that is, the inner peripheral end P of the second end cutting edge 9B) between the second end cutting edge 9B and the concavely curved surface 10 and the geometric center C of a hemisphere which the end cutting edge 9 forms in the rotational locus around the axis O, and the axis O is set to be in a range of 1° to 10°.

The extended portion 8c of the first tip flank face 8A and the concavely curved surface 10 are formed in a very small range in the vicinity of the axis O in the tip of the end mill main body 1.

However, in FIG. 4B, for description, the radius of the hemisphere which the rotational locus of the end cutting edge 9 forms is shown to be smaller than that in FIG. 4A and the included angle θ is shown to be inversely large.

Further, in this embodiment, the tip-first flank face 8a of the first tip flank face 8A is extended, whereby the extended portion 8c is formed, and accordingly, on the axis O in the tip of the end mill main body 1, the tip-first flank faces 8a of the two first tip flank faces 8A are also formed so as to cross each other beyond the axis O.

In this way, a chisel 11 which is formed by the intersection of the tip-first flank faces 8a of the first tip flank faces 8A is formed between the two first gashes 7A.

The chisel 11 is formed so as to intersect with the two first end cutting edges 9A at an obtuse angle when viewed from the front, and be orthogonal to the axis O.

In the ball end mill configured in this manner, as described above, the first tip flank face 8A is extended toward the second tip flank face 8B, whereby the extended portion 8c is formed. The concavely curved surface 10 which is concavely curved with respect to the extended portion 8c and extends to the outer periphery side of the end mill body 1 is formed between the extended portion 8c and the second tip flank face 8B.

Therefore, it is possible to prevent a projection portion from being formed at the inner peripheral end, as in a case where the second end cutting edge 9B is formed at the intersection ridgeline portion between the second tip flank face 8B away from the axis O and the wall surface facing the end mill rotation direction T of the second gash 7B.

That is, if the first tip flank face 8A is not extended and the first tip flank face 8A remains formed to a place where it reaches the axis O in the tip of the end mill main body 1, the valley floor portion of the second gash 7B becomes a concavely curved line in a cross section due to roundness or shear drop of a gash grinding wheel. Therefore, an inner peripheral end Q of the second end cutting edge 9B, which is formed at the intersection ridgeline portion between the wall surface facing the end mill rotation direction T of the second gash 7B and the second tip flank face 8B, slightly protrudes further to the end mill rotation direction T side than a portion where the rotational locus of the second end cutting edge 9B forms a hemispherical shape, as shown in FIG. 5A.

Figure 5B:
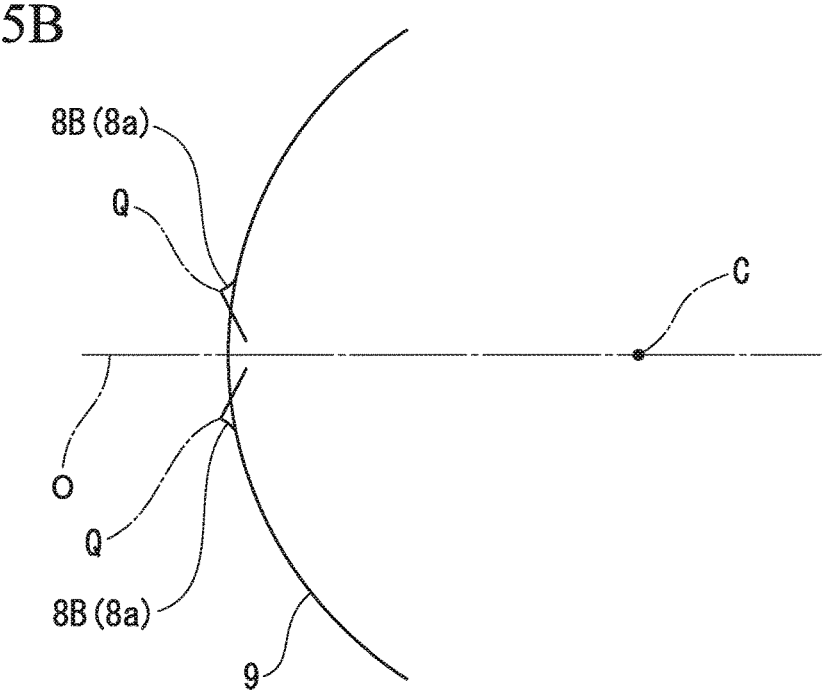
FIG. 5B is a schematic diagram of a rotational locus in the vicinity of the axis in the tip of the end mill main body before the extended portion of the first tip flank face and the concavely curved surface when manufacturing the embodiment shown in FIG. 1 are formed, and a schematic diagram showing a cross section of the rotational locus along the axis (however, for description, the radius of a hemisphere which the rotational locus forms is made to be smaller than that in FIG. 5A).

However, the second tip flank face 8B in which the second end cutting edge 9B is formed at the intersection ridgeline portion with the wall surface of the second gash is applied with a clearance angle so as to gradually retreat from the rotational locus toward the rear side in the end mill rotation direction T. Therefore, conversely, if the inner peripheral end Q protrudes to the end mill rotation direction T side, also in the rotational locus around the axis O, the inner peripheral end Q protrudes from the hemisphere which the rotational locus of the end cutting edge 9 forms, as shown in FIG. 5B, and thus, a projection portion is formed.

In contrast, in the ball end mill having the above-described configuration, as shown in FIG. 4A, the first tip flank face 8A is extended toward the second tip flank face 8B, whereby the extended portion 8c is formed. Therefore, it is possible to prevent the inner peripheral end P of the second end cutting edge 9B from protruding further toward the end mill rotation direction T side than a portion forming a hemispherical rotational locus of the second end cutting edge 9B.

Accordingly, as shown in FIG. 4B, also in the rotational locus around the axis O, a projection portion protruding from the hemisphere which the end cutting edge 9 forms can be prevented from being formed at the inner peripheral end P of the second end cutting edge 9B.

Therefore, according to the ball end mill having the above-described configuration, it is possible to prevent machining accuracy from deteriorating due to damage by a streak which is applied to a machined surface of a workpiece by the projection portion. Further, it is also possible to prevent fracturing from occurring in the end cutting edge 9 due to a projection portion being broken and caught in the end cutting edge 9 during cutting work. For this reason, it becomes possible to encourage the extension of the service life of the ball end mill while attaining improvement in machining accuracy.

Further, the first gash 7A is formed so as to extend beyond the axis O toward the inner periphery side of the end mill main body 1, and therefore, it is possible to secure a large discharge pocket for chips by the first gash 7A, which communicates with the chip discharge groove 4, in the vicinity of the axis O. For this reason, it is possible to improve the dischargeability of chips which are produced by the first end cutting edge 9A which extends further to the vicinity of the axis O than the second end cutting edge 9B. Therefore, it is also possible to prevent fracturing from occurring in the first end cutting edge 9A due to chip packing in the vicinity of the axis O.

Further, in this embodiment, the first and second gashes 7A and 7B are formed with a distance therebetween without intersecting one another, and therefore, it is possible to secure the strength of the tip portion of the end mill main body 1. Therefore, it is possible to further reliably prevent fracturing of the first and second end cutting edges 9A and 9B.

In particular, in this embodiment, each of the first and second gashes 7A and 7B is formed by two at the tip portion of the end mill main body 1. However, the first gashes 7A are also formed with a distance therebetween without intersecting one another. Therefore, all of the four gashes 7 do not communicate with each other, and thus, it is possible to attain further improvement in the strength of the end mill main body 1.

However, if the second gash 7B is formed so as not to exceed the axis O, the second gash 7B may intersect with the first gash 7A.

Further, the second end cutting edge 9B intersects with the concavely curved surface 10 at an obtuse angle at the inner peripheral end P thereof, and therefore, it is also possible to secure the strength in the inner peripheral end P of the second end cutting edge 9B. Therefore, it is also possible to prevent fracturing from occurring in the second end cutting edge 9B from the inner peripheral end P. Therefore, according to the ball end mill having the above-described configuration, it becomes possible to attain even further extension of the service life.

Further, the concavely curved surface 10 may have a plane shape and may have a concavo-convex curved surface or the like. Further, the concavely curved surface 10 may intersect with the extended portion 8c of the first tip flank face 8A at an angle or may be connected thereto through a concave surface.

Further, in this embodiment, the included angle θ between the straight line L connecting the inner peripheral end P of the second end cutting edge 9B and the center C of the hemisphere which the rotational locus of the end cutting edge 9 forms and the axis O is set to be in a range of 1° to 10°. Therefore, it is possible to prevent occurrence of fracturing or the like due to a cutting load on the first end cutting edge 9A becoming too large, while reliably preventing formation of a projection portion by securing the sizes of the extended portion 8c of the first tip flank face 8A and the concavely curved surface 10 to some extent.

That is, if the included angle θ is less than the above range, the extended portion 8c of the first tip flank face 8A or the concavely curved surface 10 also becomes small. For this reason, a concern arises that it may not become possible to reliably prevent a projection portion from being formed at the inner peripheral end P of the second end cutting edge 9B.

On the other hand, if the included angle θ is larger than the above range, the inner peripheral end P of the second end cutting edge 9B becomes too far from the axis O, and thus, a portion in which cutting is performed by only the first end cutting edge 9A further toward the inner periphery side than the inner peripheral end P becomes too large. Therefore, there is a concern that fracturing may occur due to a load on the first end cutting edge 9A during cutting also becoming large, and wear or the like may be promoted.

Further, in this embodiment, the second end cutting edge 9B directly intersects with the concavely curved surface 10 at an obtuse angle at the inner peripheral end P. However, it is favorable if the second end cutting edge 9B and the concavely curved surface 10 are connected so as to extend in directions intersecting one another at an obtuse angle. That is, a chamfered portion or a rounded convexly-curved portion may be interposed between the second end cutting edge 9B and the concavely curved surface 10. In such a case, it is favorable if the included angle θ between the straight line L connecting the intersection point between an extended line of the second end cutting edge 9B and an extension surface of the concavely curved surface 10 and the center C of the hemisphere which the rotational locus of the end cutting edge 9 forms, and the axis O is set to be in a range of 1° to 10°.

Further, in order for the second end cutting edge 9B to be connected to the concavely curved surface 10 to extend in a direction intersecting with the concavely curved surface 10 at an obtuse angle, it is favorable if the second end cutting edge 9B or the extended line thereof intersects with an intersection ridgeline portion between the concavely curved surface 10 or the extension surface thereof and a rake face of the second end cutting edge 9B, or an intersection ridgeline portion between the concavely curved surface 10 or the extension surface thereof and the second tip flank face 8B (the tip-first flank face 8a) of the second end cutting edge 9B, at an obtuse angle.

Furthermore, in this embodiment, the tip portion of the end mill main body 1 has a rotational symmetry shape through 180° around the axis O, and the two first gashes 7A and the two second gashes 7B are formed alternately in the circumferential direction. Between the two first gashes among these, the first tip flank faces 8A intersect, whereby the chisel 11 is formed. For this reason, in the vicinity of the axis O with which the chisel 11 intersects, it is possible to perform cutting work so as to scrape off the machined surface of a workpiece by the chisel 11 during cutting. Therefore, it is also possible to attain improvement in machined surface roughness.

Further, in this embodiment, the two first gashes 7A and the two second gashes 7B are formed alternately in the circumferential direction at the tip portion of the end mill main body 1. Then, all the end cutting edges 9 formed at the intersection ridgeline portions between the wall surfaces facing the end mill rotation direction T of these gashes 7 and the first and second tip flank faces 8A and 8B become the first and second end cutting edges 9A and 9B extended to the vicinity of the axis O.

However, a so-called short end cutting edge, in which the included angle θ that the straight line L connecting the inner peripheral end and the center C makes with the axis O is larger than the above-described range, and thus, the end cutting edge is not extended to the vicinity of the axis O of the tip of the end mill main body 1, may be formed between the first and second end cutting edges 9A and 9B in the circumferential direction.

In such a case, a gash in which the short end cutting edge is formed on a wall surface facing the end mill rotation direction T may communicate with the gash 7 adjacent to the rear side in the end mill rotation direction T.

Further, in this embodiment, a total of four end cutting edges 9 are extended to the vicinity of axis O. However, two or three end cutting edges 9 may be extended to the vicinity of axis O. Among these, the two end cutting edges 9 adjacent to each other in the circumferential direction become the first and second end cutting edges 9A and 9B, and alternatively, a configuration is also acceptable in which five or more end cutting edges 9 are extended to the vicinity of axis O, and among these, at least two end cutting edges 9 adjacent to each other in the circumferential direction become the first and second end cutting edges 9A and 9B.

INDUSTRIAL APPLICABILITY

According to an aspect of the present invention, it is possible to improve chip dischargeability in the vicinity of the axis in the tip of the end mill main body and to prevent a projection portion from being formed in the vicinity of the axis. A streak being applied to the machined surface of a workpiece by a projection portion, or occurrence of fracturing due to a projection portion being broken and caught in an end cutting edge during cutting work, can be prevented. Therefore, it becomes possible to provide a ball end mill having a longer service life and high machining accuracy.

Therefore, the present invention has industrial applicability.

REFERENCE SIGNS LIST

1: end mill main body
3: cutting edge portion
4: chip discharge groove
6: peripheral cutting edge
7: gash
7A: first gash
7B: second gash
8: tip flank face
8A: first tip flank face
8B: second tip flank face
8a: tip-first flank face
8b: tip-second flank face
8c: extended portion
9: end cutting edge
9A: first end cutting edge
9B: second end cutting edge
10: concavely curved surface
11: chisel
O: axis of the end mill main body 1
T: end mill rotation direction
P: inner peripheral end of the second end cutting edge 9B
C: center of hemisphere which rotational locus of the end cutting edge 9 forms
L: straight line connecting the inner peripheral end P and the center C θ: included angle between the straight line L and the axis O

The invention claimed is:

1. A ball end mill comprising:

an end mill main body which rotates in an end mill rotation direction around an axis; a plurality of chip discharge grooves formed at intervals in a circumferential direction at an outer periphery of a tip portion of the end mill main body;

a plurality of gashes which are respectively formed at a tip portion of each of the plurality of chip discharge grooves, and which extend toward the axis, the plurality of gashes including a gash wall surface that faces the end mill rotation direction;

a plurality of tip flank faces, wherein each of the plurality of tip flank faces is intersected with a respective gash wall surface of the plurality of gashes, wherein a plurality of end cutting edges are respectively formed at the intersection between the gash wall surface of each of the plurality of gashes and each of the plurality of tip flank faces;

the plurality of end cutting edges are formed so that a rotation locus of each of the plurality of end cutting edges forms a convex hemispherical shape with a geometric center on the axis, the convex hemispherical shape being a shape of the tip portion of the end mill main body;

the plurality of end cutting edges are extended to the vicinity of the axis in the tip portion of the end mill main body;

two adjacent end cutting edges of the plurality of end cutting edges which are adjacent to each other in the circumferential direction are defined as a first end cutting edge and a second end cutting edge;

among the plurality of gashes, a gash in which the first end cutting edge is formed is defined as a first gash;

among the plurality of gashes, a gash in which the second end cutting edge is formed is defined as a second gash;

among the plurality of tip flank faces, a tip flank face in which the first cutting edge is intersected is defined as a first tip flank face;

among the plurality of tip flank faces, a tip flank face in which the second cutting edge is intersected is defined as a second tip flank face;

in a front view of the tip portion of the end mill body from an axial direction, the first tip flank face has an extended leg portion formed so as to extend between the first gash and the second gash in a direction substantially perpendicular to the first cutting edge and toward the second tip flank face, a leading edge, in the rotation direction, of the extended leg portion is substantially parallel to the second cutting edge;

in a front view of the tip portion of the end mill body from the axial direction, the first gash is formed so as to extend from an outer periphery side of the end mill main body and extend past the axis on the tip portion of the end mill main body;

in a front view of the tip portion of the end mill body from the axial direction, the second gash is formed so as to extend from the outer periphery side of the end mill main body and be apart from the axis so as to not extend past the axis on the tip of the end mill main body;

a concavely curved surface which is formed between the extended leg portion of the first tip flank face and the second tip flank face;

the concavely curved surface is connected to the extended leg portion of the first tip flank face and extends toward the outer periphery side of the end mill main body;

the second end cutting edge intersects with the concavely curved surface at an obtuse angle at an inner radial end thereof;

an included angle between an imaginary straight line passing through the intersection point between the second end cutting edge and the concavely curved surface and the geometric center of the hemispherical shape of the tip portion of the end mill main body hemisphere formed by the rotation locus of the end cutting edges, and the axis is formed in a range of 1° to 10°; and the plurality of end cutting edges being divided into a first end cutting edge group and a second end cutting edge group, the cutting edges in the first cutting edge group are a plurality of the first end cutting edge and the cutting edges of the second end cutting edge group are a plurality of the second end cutting edge, wherein, in the circumferential direction, the first end cutting edges and the second end cutting edges are arranged alternately with respect to one another.

2. The ball end mill according to claim 1, wherein the plurality of chip discharge grooves are four in number, the plurality of gashes and the plurality of end cutting edges are respectively four in number, and respectively formed at regular intervals in the circumferential direction in correspondence with the four chip discharge grooves;

the two first gashes are formed with a distance therebetween without intersecting one another.

3. The ball end mill according to claim 2, wherein a chisel is formed between the two first gashes and is formed by the intersection of the two first tip flank faces.

4. The ball end mill according to claim 3, wherein the chisel intersects with the two first end cutting edges at an obtuse angle in a front view of the tip portion of the end mill body from the axial direction, and the chisel edge is orthogonal to the axis.

* * * * *